March 24, 1959 A. HALTMEIER 2,879,135
MANUFACTURE OF SULFURIC ACID
Filed March 21, 1955
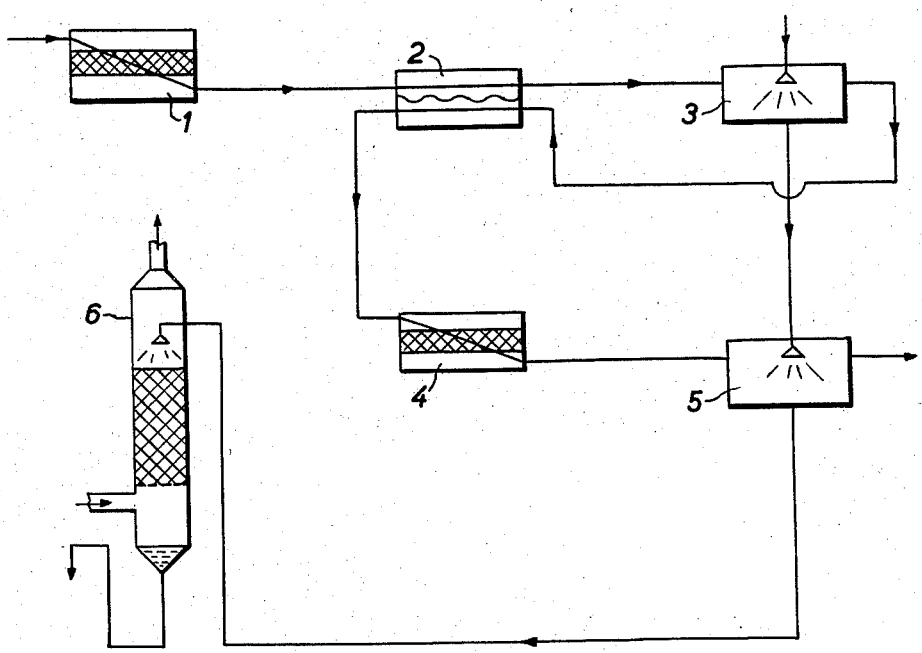
INVENTOR.
ALFRED HALTMEIER
BY
his ATTORNEYS

2,879,135

MANUFACTURE OF SULFURIC ACID

Alfred Haltmeier, Leverkusen-Bayerwerk, Germany, assignor to Farbenfabriken Bayer Aktiengesellschaft, Leverkusen, Germany, a corporation of Germany Application March 21, 1955, Serial No. 495,379

Claims priority, application Germany February 10, 1951

5 Claims. (Cl. 23—168)

The present invention relates to an improved process of manufacturing sulfuric acid.

In the conventional process of manufacturing sulfuric acid the starting materials containing sulfur are oxidized by air in burner systems or roasting furnaces. By oxidizing the resulting gases containing $SO_2$ the sulfur dioxide is converted to sulfur trioxide. The gases containing $SO_3$ thus obtained are lead into absorbers where they are contacted with sulfuric acid, whereby the sulfur trioxide is absorbed in the sulfuric acid. In this process the entire amount of heat liberated during absorption is transferred to the cooling water. As a matter of fact, the consumption of cooling water for this purpose is extraordinarily large. The process can also be carried out in the absence of cooling water if the acid is allowed to increase in temperature above 150° C. so that water vapor is released therefrom. The heat liberated in the absorption of sulfur trioxide in sulfuric acid is then utilized to evaporate water from the acid. When conducting the absorption in the aforesaid manner cooling water is not required since the heat of absorption is lead off by the water vapor escaping with the gases. The sulfuric acid thus obtained, which has a temperature of above 150° C., is cooled before filling same into storage tanks or tanks ready for shipment. The application of water-cooled metal surfaces for cooling the hot acid involves difficulties in view of corrosions which can hardly be avoided. For the purpose of cooling it is advantageous to bring air in direct contact with the sulfuric acid. However, cooling of hot sulfuric acid in direct contact with air gives rise to intense mist formation. The mist can be removed by admixing the air containing mist with the gases containing $SO_3$ before or during absorption of $SO_3$ in the hot acid.

It is among the objects of the present invention to overcome the drawbacks associated with the afore-described prior art process and to provide an improved and efficient process for the manufacture of sulfuric acid from gases containing $SO_3$ by hot absorption.

Further objects of the invention will become apparent as the following description proceeds.

In accordance with the present invention it has been found that sulfuric acid is obtained in a convenient process by bringing gases containing sulfur trioxide into contact with sulfuric acid containing water, causing part of the water to evaporate from the acid at temperatures between 150° C. and the boiling point of the acid by the heat evolved at the absorption, and cooling the hot acid by means of air, thereby recovering heated air containing sulfur trioxide in the form of mist, and roasting sulfur containing materials with the heated air containing sulfur trioxide in the form of mist. According to the invention the mist formed in cooling the hot acid with air is eliminated completely. Moreover, the heat of the air admixed with mist is returned to the process and the combustion rate of the materials containing sulfur is increased. The high temperature prevailing at the absorption of sulfur trioxide in sulfuric acid offers the possibility of substantially increasing the conversion rate of sulfur dioxide to sulfur trioxide in the converters since the high temperature of the gases coming from the hot absorption of sulfur trioxide, which still contain sulfur dioxide because of the incomplete conversion in the preceding oxidation, permits subjecting these gases to another oxidation treatment subsequent to the $SO_3$ absorption.

In the process the equilibrium of the gas reaction, which equilibrium had almost been approximated by the first oxidation step, is displaced by absorption of the reaction products ($SO_3$) to a large extent. The reaction velocity of the subsequent oxidation step may be accelerated by previously heating the gases containing sulfur dioxide coming from the absorption at high temperature. For this purpose these gases are for instance brought in indirect heat exchange with gases coming from a roasting furnace or coming from a dust separation carried out at high temperatures.

The invention will be more fully understood by reference to the following detailed description and accompanying drawing illustrating one embodiment of the invention. Referring specifically to the drawing, which shows an apparatus in sectional elevation adapted to carry out the herein described process of manufacturing sulfuric acid, gases from roasting which consist for instance of 1 mol of $SO_2$, 1.5 mols of $H_2O$ steam, 1.5 mols of $O_2$ and 14 mols of $N_2$, enter at a temperature of 420° C. a contact 1 wherein 80% of the sulfur dioxide content of the gases are oxidized to sulfur trioxide. The gases leave the contact 1 at a temperature of 560° C. and the composition 0.8 mol of $SO_3$, 0.2 mol of $SO_2$, 1.5 mols of $H_2O$, 1.1 mols of $O_2$ and 14 mols of $N_2$, and are then passed into a heat exchanger 2 wherein they are cooled to 350° C. Previous cooling of the gases is detrimental to the subsequent hot absorption in absorber 3 wherein the $SO_3$ content of the gases is absorbed in hot sulfuric acid, since, as experience teaches, the absorption is the more complete the higher the temperatures of the reactants. Therefore, it is more preferable to arrange the heat exchanger 2 in front of the contact 1. (The arrangement of the heat exchanger 2 as shown in the drawing is chosen to facilitate inspection of the flow sheet.) The $H_2O$ required for binding the sulfur trioxide to be absorbed is fed into the heat absorber 3 in form of sulfuric acid containing water. In the embodiment illustrated in the drawing, it is assumed that 1.2 mols of $H_2SO_4$ containing 5 mols of $H_2O$ are introduced at a temperature of 120° C. into the heat absorber 3 which may be designed for instance as a drum-type absorber. By absorption of 0.792 mol of sulfur trioxide from the gases and concurrent evaporation of 2.3 mols of $H_2O$ the composition of the acid is changed to 1.992 mols of $H_2SO_4$ and 1.895 mols of $H_2O$. The gases issuing from the absorber 3 consist of 0.008 mol of $SO_3$, 0.2 mol of $SO_2$, 3.8 mols of $H_2O$, 1.1 mols of $O_2$ and 14 mols of $N_2$. These gases have a temperature of 250° C. which is preferably raised to for instance 420° C. before the gases enter the contact 4. This is attained by the heat exchanger 2 which, as mentioned above, is preferably positioned in front of the contact 1. After passing the heat exchanger 2 the gases having a temperature of 420° C. and the composition 0.008 mol of $SO_3$, 0.2 mol of $SO_2$, 3.8 mols of $H_2O$, 1.1 mols of $O_2$ and 14 mols of $N_2$, enter the contact 4 wherein the residual 0.2 mol of $SO_2$ are oxidized to sulfur trioxide to 95%. The gases issuing from the contact 4 have the composition 0.198 mol of $SO_3$, 0.01 mol of $SO_2$, 3.8 mols of $H_2O$, 1.005 mols of $O_2$, 14 mols of $N_2$, and a temperature of 430° C. These gases are lead to the hot absorber 5 wherein the sulfur trioxide formed in contact 4 is absorbed in hot sulfuric acid almost completely. The hot absorber 5 can be charged with hot sulfuric acid from the hot absorber 3, having for instance the composition 1.992 mols of $H_2SO_4$ and 1.895 mols of $H_2O$ and a temperature of 240° C. The final gases issuing from the absorber 5 at a temperature of 260° C. have the composition 0.003 mol of $SO_3$, 0.01 mol of $SO_2$, 4.9 mols of $H_2O$, 1.005 mols of $O_2$ and 14 mols of $N_2$. Hot sulfuric acid of 260° C. is formed in the absorber 5 with a composition of 2.187 mols of $H_2SO_4$ and 0.613 mol of $H_2O$, which acid is subsequently cooled by air and concentrated. The cooling is accomplished in the air cooler 6 wherein the acid is lead in direct contact with and in counter-current to 14 mols of air containing 0.3 mol of $H_2O$, which enters the air cooler at 20° C. The hot acid gives off heat and vapors to the air and issues from the air cooler 6 at 50° C. and the composition 1.9 mols of $H_2SO_4$ and 0.2 mol of $H_2O$. The air used for cooling takes up heat and vapors from the acid and leaves the air cooler 6 at 180° C. and the composition 14 mols of air, 0.713 mol of $H_2O$ and 0.287 mol of $H_2SO_4$. The hot mist is lead to the roasting furnaces wherein the $H_2SO_4$ content is converted by the high temperature to $SO_2$ which is recovered by admixing with the gases from roasting; the oxygen content and the heat are likewise utilized in the roasting process.

This application is a continuation-in-part application to my copending application Serial No. 269,125, filed January 30, 1952, now abandoned.

I claim:

1. In a process for the manufacture of sulfuric acid from the oxides of sulfur evolved in the roasting of sulfur-containing materials, the improvement comprising roasting said sulfur containing materials with heated air containing sulfur trioxide and sulfur dioxide in the form of mist, said heated air and mist being evolved from cooling the sulfuric acid by direct contact with air.

2. In a process for the manufacture of sulfuric acid by roasting sulfur-containing materials to sulfur dioxide, oxidizing the sulfur dioxide to sulfur trioxide, contacting the sulfur trioxide which contains residual sulfur dioxide with aqueous sulfuric acid at a temperature between 150° C. and the boiling point of the acid, and subsequently cooling the hot sulfuric acid by direct contact with air, thereby recovering heated air containing sulfur dioxide and sulfur trioxide in the form of mist, the improvement comprising recycling said hot air and mist directly to the initial roasting step to form additional sulfur dioxide whereby the mist is eliminated and the heat content of the recycled gas is utilized in the roasting step.

3. Process of claim 2 wherein the gases from the roasting step containing sulfur dioxide are heated to a temperature of about 420° C. before the oxidation step.

4. Process of claim 3 wherein said heating is effected by indirect heat exchange with other gases having a higher sulfur dioxide content and a higher temperature.

5. Process for the manufacture of sulfuric acid which comprises roasting sulfur-containing materials to produce a gas containing sulfur dioxide, heating said gases to a temperature of 420° C., and then oxidizing the majority of the sulfur dioxide content to sulfur trioxide, cooling the gases from the oxidation step to about 350° C. and passing the cooled gases into aqueous sulfuric acid wherein substantially all of the sulfur trioxide is absorbed, recovering the un-absorbed gases and heating them to a temperature of about 420° C., oxidizing substantially the entire sulfur dioxide content of the heated gases to sulfur trioxide, absorbing the sulfur trioxide in hot aqueous sulfuric acid, cooling the hot sulfuric acid by direct contact with air with the resultant formation of hot air containing sulfur dioxide and sulfur trioxide mist, recycling said hot air and mist directly to the initial roasting step to form additional sulfur dioxide whereby the mist is eliminated and the heat content of the recycled gas is utilized in the roasting step, said additional sulfur dioxide formed in this step being re-processed along with the other gases evolved during roasting.

References Cited in the file of this patent

UNITED STATES PATENTS

| | | |
|---|---|---|
| 1,823,372 | Merriam | Sept. 15, 1931 |
| 2,028,416 | Silsby | Jan. 21, 1936 |
| 2,146,792 | Bruekmann et al. | Feb. 14, 1939 |
| 2,199,691 | Carter | May 7, 1940 |
| 2,655,431 | Allen et al. | Oct. 13, 1953 |
| 2,730,431 | Haltmeier | Jan. 10, 1956 |